Nov. 3, 1964  F. R. REID  3,154,986
DOUGH CUTTER
Filed Oct. 18, 1961  5 Sheets-Sheet 1
FIG. 1
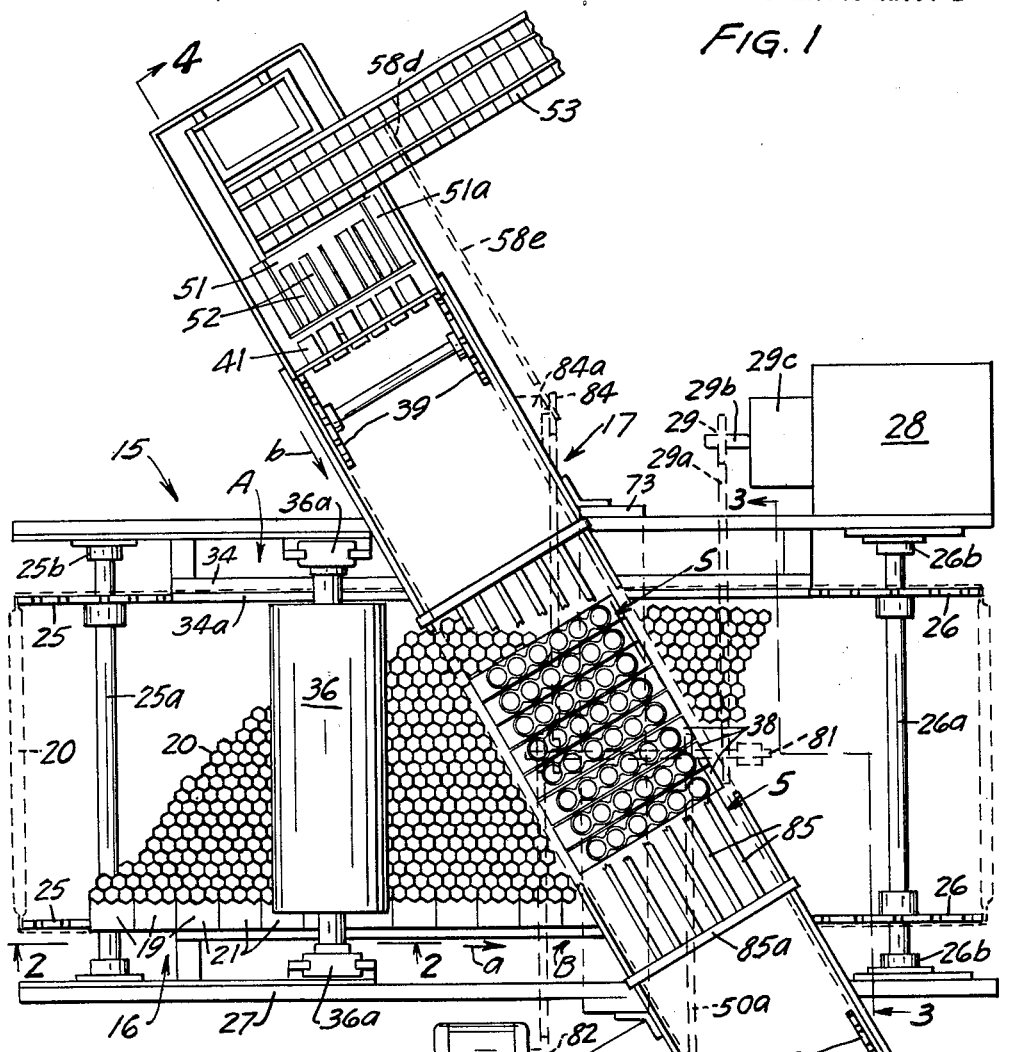
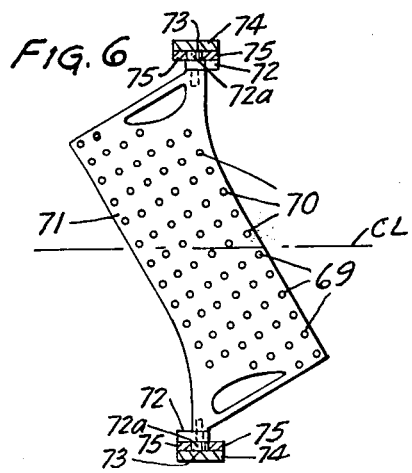
FIG. 6
INVENTOR
FRANCIS R. REID
BY Williamson Palmatier
ATTORNEYS Nov. 3, 1964  F. R. REID  3,154,986
DOUGH CUTTER Filed Oct. 18, 1961  5 Sheets-Sheet 2

INVENTOR
FRANCIS R. REID
BY
Williamson & Palmatier
ATTORNEYS

Nov. 3, 1964 F. R. REID 3,154,986
DOUGH CUTTER
Filed Oct. 18, 1961 5 Sheets-Sheet 3

INVENTOR
FRANCIS R. REID
BY
Williamson, & Palmatier
ATTORNEYS

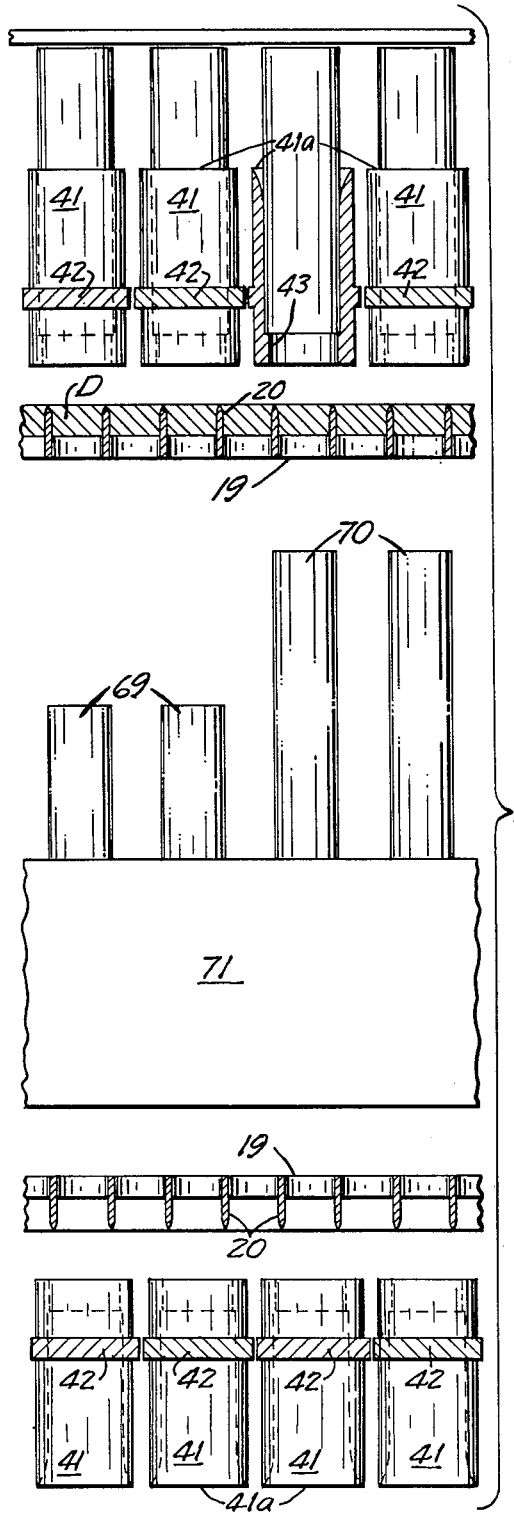
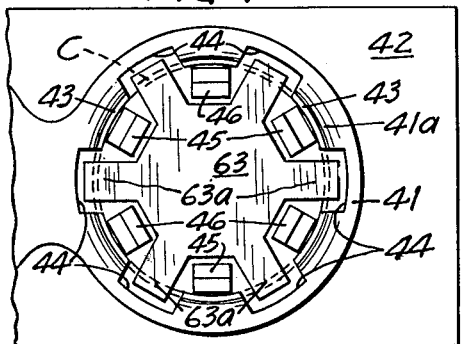
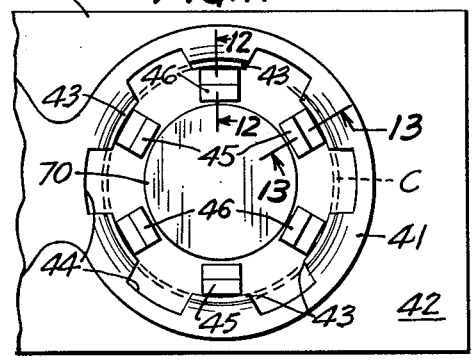
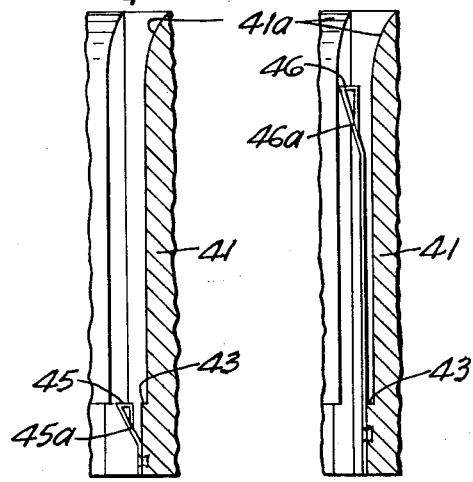

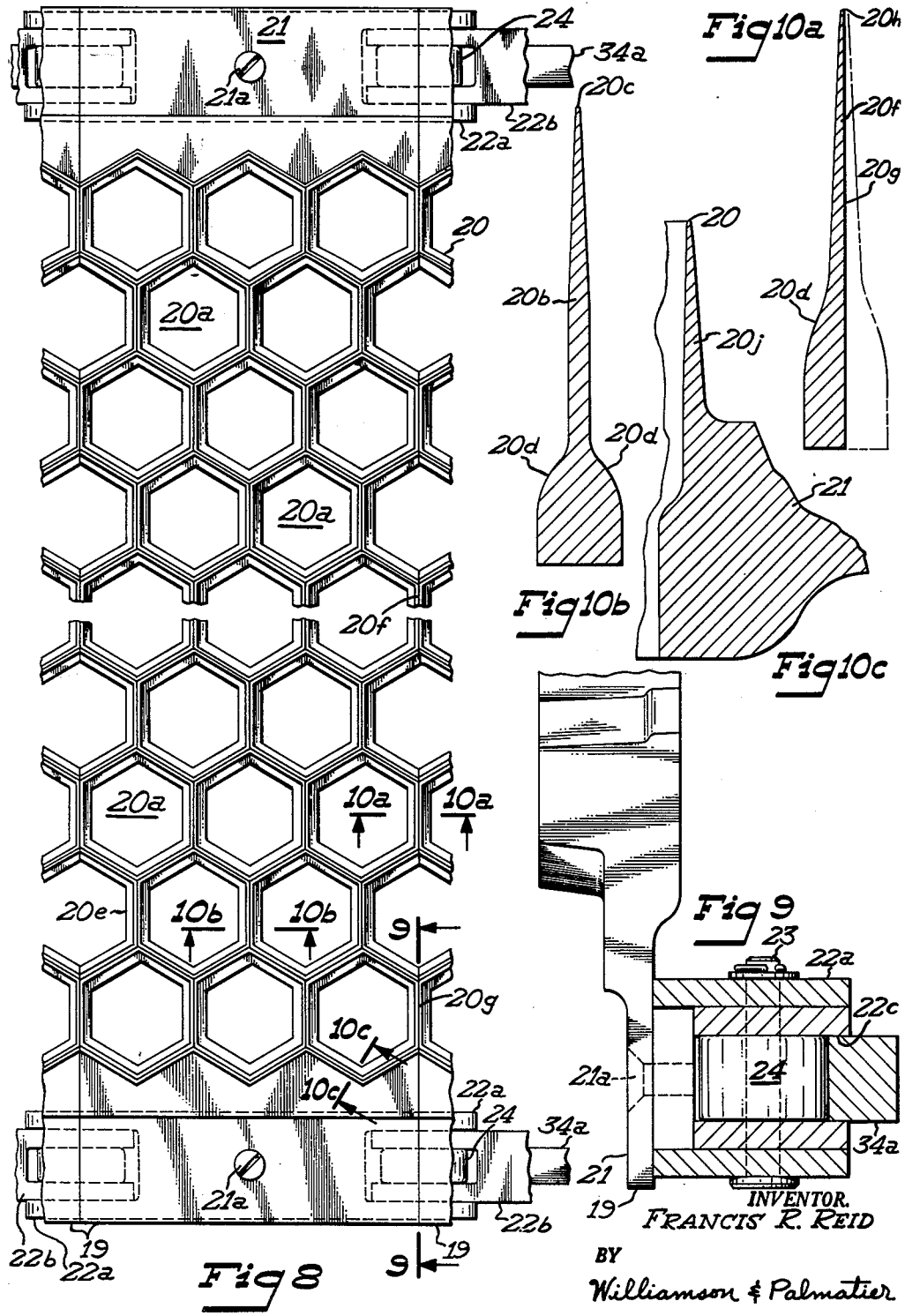

United States Patent Office 3,154,986
Patented Nov. 3, 1964

3,154,986
DOUGH CUTTER
Francis R. Reid, Pleasure Ridge Park, Ky., assignor to The Pillsbury Company, Minneapolis, Minn., a corporation of Delaware
Filed Oct. 18, 1961, Ser. No. 145,872
11 Claims. (Cl. 83—123)

This invention relates to dough handling apparatus and more particularly relates to a machine for forming dough wafers and packing the wafers in cans.

Although dough wafer forming and packing machines have been known in the past, such machines have had numerous disadvantages. One of such important disadvantages is that certain dough, which is essentially of laminate form, tends to delaminate in the cutting of dough wafers in the manipulation of the wafers in packaging. As a result, the control over the detached parts of the dough is lost, and these detached parts will fall and turn and produce any of a number of various types of malfunctions in the packaging operation.

Another of the distinct disadvantages of known dough piece forming and packing machines is that difficulty is encountered in properly controlling the cans and making sure that they are at the precise position necessary for proper filling. It will be understood that when the cans are being filled, the bottom covers are on the cans, and because of the peripheral bead of the bottom cover which protrudes slightly beyond the outer surface of the can sidewall, the cans which sit in an upright position as is necessary in known machines, are not adequately supported against wobbling and tilting.

It has also been difficult in such known machines to form and pack, without excessive maintenance, dough pieces which are coated on top with sticky types of icings.

With these comments in mind, it is to the elimination of these and other disadvantages that my invention is directed, along with other novel and desirable features.

An object of my invention is to provide a new and improved dough wafer forming and packing machine of relatively simple and inexpensive construction and operation.

Another object of my invention is to provide a novel machine for handling and packing wafers of generally laminated type dough and preventing delamination of the dough during manipulation of the wafers.

Still another object of my invention is the provision of an improved and novel apparatus for readily and easily packing dough wafers into containers in such a manner that the presence of various icings or special coating agents on the wafers will not affect the operation of the apparatus.

A further object of my invention is to provide an improved apparatus for packing dough wafers into cans which are accurately and positively controlled so as to properly position the cans at the precise location desired during the filling operation.

A still further object of my invention is the provision of a new and novel apparatus for forming from a blanket of dough, a maximum number of dough wafers and packing said dough wafers into cans with a minimum of tearing or mutilation of the dough and a minimum of reworking of the dough.

These and other objects and advantages of my invention will more fully appear from the following description, made in connection with the accompanying drawings, wherein like reference characters refer to the same or similar parts throughout the several views and in which:

FIG. 1 is a top plan view of the machine and having certain parts broken away for clarity of detail;

FIG. 5 is an enlarged detail section view taken approximately at 5—5 in FIG. 1;

FIG. 6 is a detail section view taken approximately at 6—6 in FIG. 3;

FIG. 7 is an enlarged detail view taken approximately at 7—7 in FIG. 4;

FIG. 8 is an enlarged detail view taken approximately at 8—8 of FIG. 3;

FIG. 9 is a detail section view taken approximately at 9—9 in FIG. 8;

FIG. 10 is a detail section- view taken at 10—10 in FIG. 8;

FIG. 10a is an enlarged detail section view taken at 10a—10a in FIG. 8;

FIG. 10b is an enlarged detail section taken at 10b—10b in FIG. 8; and

FIG. 10c is an enlarged detail section taken at 10c—10c in FIG. 8.

FIG. 11 is an enlarged detail view taken approximately at 11—11 of FIG. 3, but having the cams removed for clarity of detail;

FIG. 12 is a detail section view taken at 12—12 in FIG. 11;

FIG. 13 is a detail section view taken at 13—13 in FIG. 11; and

Figure 2:
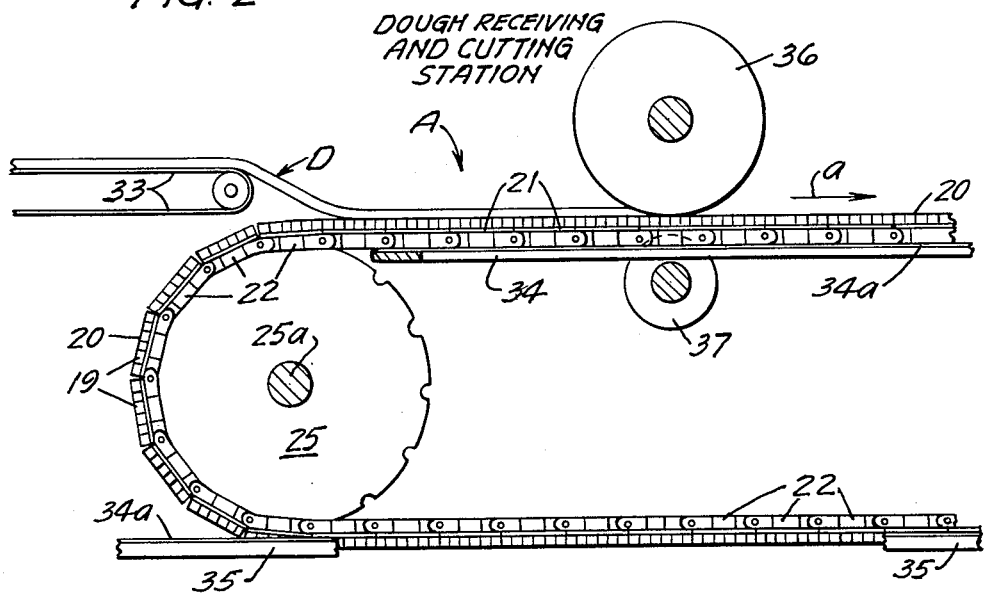
FIG. 2 is a detail section view taken substantially at 2—2 in FIG. 1.
Figure 4:
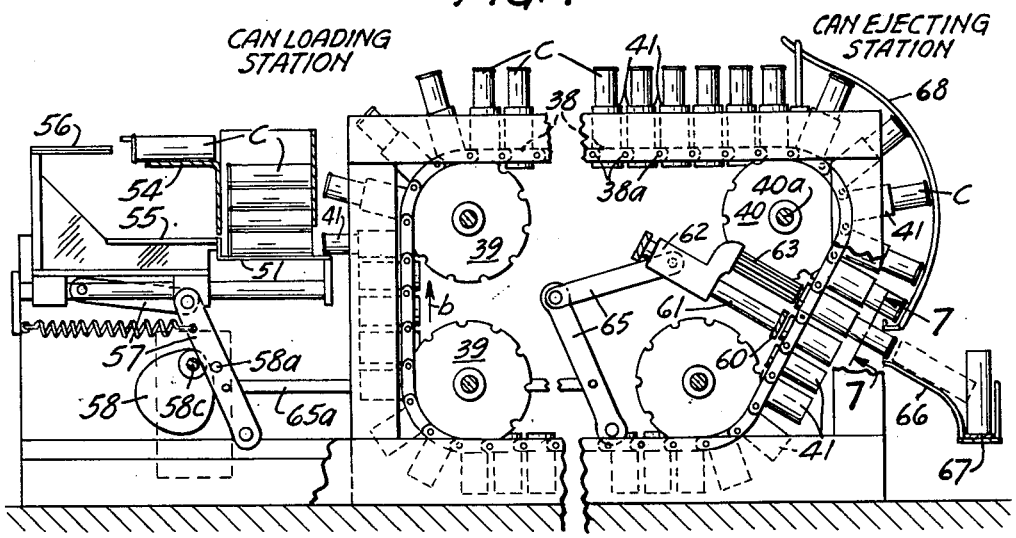
FIG. 4 is a detail section view taken approximately at 4—4 in FIG. 1 and having portions broken away for clarity of detail.

The dough wafer-forming and packing machine is indicated in general by numeral 15 and includes a dough-carrying and cutting mechanism 16 and a can-holding and conveying mechanism 17, and a can-filling mechanism 18.

The mechanism includes a plurality of elongate cutter units each having a gridwork 20 defining a plurality of hexagonally shaped dough-receiving openings and endwise extending mounting plates 21 formed integrally with the gridwork. The openings 20a of the gridwork are bounded by a plurality of integrally formed sidewalls 20b which are common to contiguous openings 20a. The several sidewalls 20b surround each opening 20a and are provided with sharpened upper edges 20c so as to provide a continuous cutting edge around the periphery of each opening 20a. It will be seen in FIG. 10b that the wall 20b tapers gradually in a downward direction from the edge 20c and then flares sharply at 20d so as to define a dough wafer-supporting ledge protruding into the opening 20a. It will be understood that when the dough is pressed downwardly on the edges 20c and into the cutters, the individual wafers of dough which are formed will shrink slightly and will subsequently be supported on the inwardly protruding ledge or shoulder defined by the flared surface 20d.

In FIG. 8 it will be seen that each of the cutter units 19 has fore-and-aft sides confronting the next adjacent cutter units in the continuous cutter belt. The fore-and-aft sides of each of the cutter units are provided with matching three-sided semi-hexagonal recesses 20e which confront and cooperate with corresponding recesses in the next adjacent cutter units 19 in defining cutter openings. The fore-and-aft sides of each of the cutter units 19 also have a plurality of sidewalls 20f which have the sharply flared surface portion 20d which is common to all of the cutter sidewalls in the gridwork. Each of the sidewalls 20f is of reduced thickness as compared to the sidewalls 20b and is provided with an endwise facing surface 20g lying flush against a similar surface 20g of the next adjacent cutter unit 19. The end walls 20f taper to dough cutting edges 20h in an upward direction so as to cooperatively function along with the other edges 20c in cutting the dough blanket.

The end plates 21 of the cutter units are fixed by screws 21a to support links 22a and 22b. It will be seen that the links 22a and 22b are alternately employed on adjacent cutter units 19 and that all of the support links 22a and 22b have bifurcated interfitting ends which are pivotally interconnected by pins 23. The pins 23 also rotatably mount rollers 24 which are received within the bifurcated ends of the support links 22b. The support links 22a and 22b have inverted channel-shape, and the bifurcated ends of the support links 22b cooperate with the rollers 24 in defining a guideway 22c receiving the guide bars or bearing strips 34a which are rigid with the frame of the machine. It will be noted in FIG. 10c that the mounting plate 21 of each of the cutter units 19 is formed integrally with the gridwork 20 and the outermost opening-defining wall 20j. The support links 22a and 22b, together with rollers 24 and pins 23 define chains which are trained around and supported by idler sprockets 25 and drive sprockets 26 at the opposite ends of the frame 27. Sprockets 25 are fixed to a shaft 25a which is journalled in bearings 25b on the frame 27. The sprockets 26 are fixed to shaft 26a which is supported in bearings 26b on the frame 27, and the end of shaft 26a is driven by a transmission mechanism 28 which produces intermittent rotary movement of the sprockets 26 and cutter units 19 and is driven by power received through sprocket 29, chain 29a, shaft 29b, and a speed reducer 29c.

It will be seen that the gridwork 20 defines cutters disposed in rows and lines. The lines of cutters are oriented in a direction longitudinally with respect to the direction of movement indicated by arrow a. The transverse rows of cutters extend obliquely with respect to the direction of movement.

The cutter units are supported as they travel between the sprockets by upper and lower supporting plates 34 and 35 respectively which are suitably provided with nylon bearing strips 34a and 35a.

Suitable means such as a conveyor 33 supplies a blanket of dough D onto the cutter units 19 at the dough-receiving and cutting station indicated by letter A. The conveyor 33 is operated to supply the dough at the same rate of speed at which the dough is moved intermittently along the cutter units 19. Alternately, the dough blanket D may be supplied onto the cutter units 19 by apparatus disclosed and claimed in my copending application filed as of September 23, 1960, Ser. No. 58,018, and entitled Packer.

A dough-pressing roller 36 is also provided at station A and is journalled in suitable bearings 36a on the frame 27 and the periphery of the roller 36 engages the top cutting edges 20c and 20h of the cutter plates for pressing the blanket of dough D into the several openings 20a. A supporting roller 37 is journalled on bearings supported on the frame and the periphery of the roller 37 engages and supports the cutter units beneath the roller 36.

Figure 3:
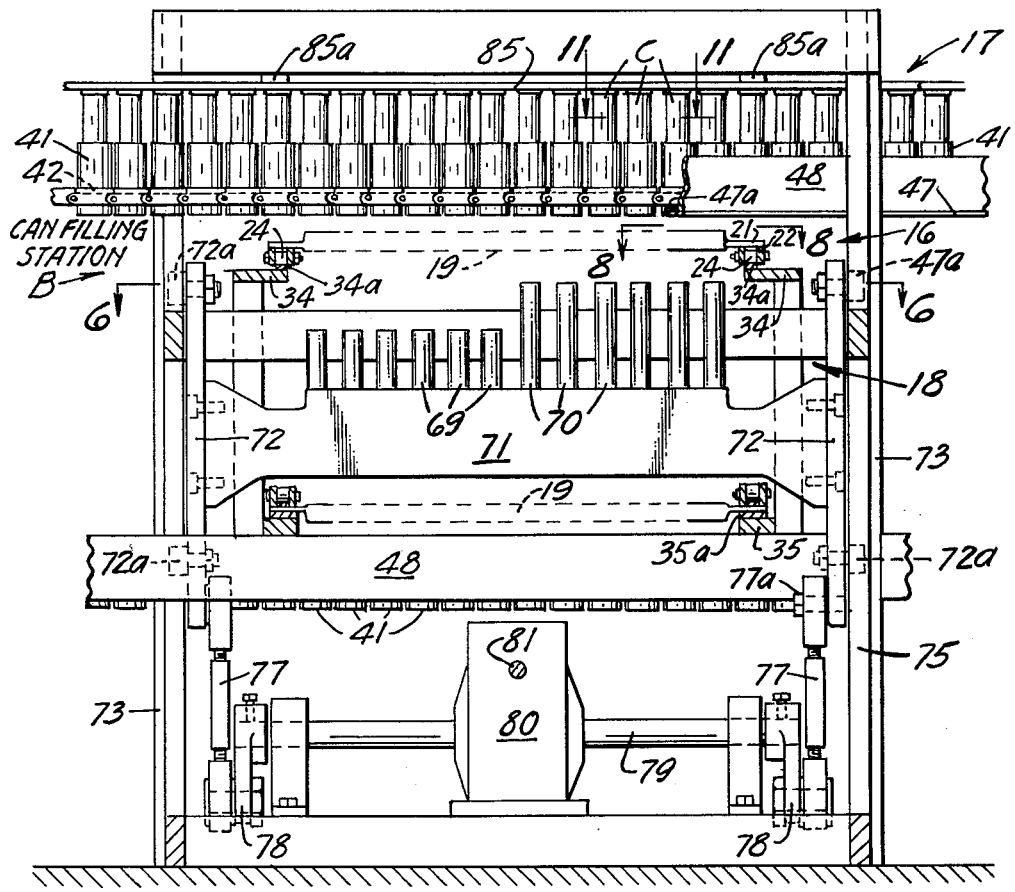
FIG. 3 is a detail section view taken approximately at 3—3 in FIG. 1 and having certain of the apparatus in the background deleted.

The mechanism 17 includes a plurality of elongate and rigid can-holding units 38 which are disposed in side-by-side relation with each other and are each pivotally interconnected by pins 38a to form a continuous can-carrying conveyor which is trained around idler sprockets 39 and drive sprockets 40. The upper run or leg of the can-carrying conveyor overlies the upper run or leg of the dough cutters and the lower return run of the can-carrying conveyor underlies the return run of the cutters as clearly shown in FIGS. 3 and 5.

Each of the can-carrying units 38 includes a plurality of side-by-side upright and hollow sleeves 41 which join each other and are cast as an integral multi-sleeve unit, and which are also surrounded by and formed integrally with a plate-like member 42 for connecting with the next adjacent can-carrying units. The inner periphery of each of the sleeves 41 is provided with a ledge 43 spaced inwardly from the upper can-receiving end 41a in order to prevent the peripheral end edges of the cans from moving downwardly through the sleeves beyond the ledge 43. Each of the sleeves 41 is also provided with a plurality of elongate grooves 44 extending longitudinally therethrough. Each of the sleeves is further provided with a plurality of lower and upper wafer supports 45 and 46 respectively which are constructed of strip-type, resiliently flexible material and which are spaced inwardly from the sleeve periphery so as to be movable in an outward direction toward the sleeve periphery. The wafer supports 45 and 46 are also provided with elongate resiliently flexible depending mounting shanks 45a and 46a respectively which extend obliquely downwardly and outwardly toward the sleeve periphery and are affixed by suitable means such as by counter-sunk rivets to the sleeve at a position below the ledge 43. It will be noted that the can-receiving end 41a of the inner sleeve periphery is flared upwardly and outwardly to facilitate easy entrance of a can into the sleeve.

It will be seen that the can-mounting sleeves 41 will be moved in the direction of arrow b and along the obliquely oriented rows of dough cutters, and each of the can-carrying sleeves 41 is spaced from the corresponding sleeves in the next adjacent units 38 by a distance equal to the spacing between alternate hexagonal cutters in a row of cutters extending obliquely of the cutter belt, and the sleeves 41 in each of the units 38 are spaced from each other a distance equal to the spacing between a pair of adjacent but non-contiguous cutters.

The can-conveying units 38 are supported between the sprockets by supporting bars 47 and nylon wear strips 47a and the bars 47 are affixed to the elongate guide frames 48 which are rigid with the frame 27.

The sprocket 40 is affixed to a drive shaft 40a which is connected into a transmission mechanism 49 which produces intermittent motion on the sprockets 40 and can-carrying unit 38. The transmission 49 is driven through a speed reducing mechanism 50 from a chain 50a.

Means are provided for loading the cans into the sleeves 41 and in the form shown, such means includes a can support 51 disposed adjacent the upwardly moving leg of the can conveyor and having sidewalls 51a on the edges thereof to confine the cans C in a plurality of rows wherein the cans are spaced by means of vanes 52 to the positions corresponding to the spacing between adjacent sleeves in the units 38. Cans C are supplied down a chute 53 into a ledge 54, which is above and adjacent the support 51. The bottom row of cans C is pushed into the adjacent unit 38 by means of a pusher 55 which has an upper arm 56 which pushes the cans from the ledge 54 into the space above the support 51 by means of a linkage 57 which is driven by a rotary cam 58 bearing against the cam follower 58a on the linkage. The pusher 55 may comprise a plurality of upright plates reciprocating through suitably provided slots in the plate 51. The cam is driven by a roller chain 58e.

Means are also provided for ejecting the cans from the units 38 and in the form shown a pair of rigid frame members 60 mount a guide bar 61 adjacent the downwardly traveling leg of can-carrying units 38 wherein the sleeves are tipped in a downwardly oblique position. A bearing sleeve 62 is movable on the guide 61 and carries a plurality of can-ejecting plungers 63 which are externally ribbed as is seen in FIG. 7 at 63a to be received in the grooves 44 of the sleeves for engaging the peripheral end edge of the can sidewalls and ejecting the cans from the sleeves as the pistons 63 pass therethrough. The sleeves 62 connect with a linkage 65 which is in turn connected by a link 65a to the linkage 57 to be moved simultaneously therewith. Can-receiving plate 66 adjacent the ejector plungers receives the cans as they move out of the sleeves and may direct the cans into a suitable conveyor 67 for delivering the cans away from the mechanism. It will be noted that adjacent the can-ejecting guide bars 68 are positioned in confronting relation with the outer ends of the sleeves and spaced therefrom in order to retain and guide the cans as they move with the sleeves into tipped position and downwardly along the downwardly traveling leg of the can conveyor.

At the can-filling station indicated in general by letter B, the cans pass over the dough cutters with the opening lower ends of the cans and the open lower ends of the sleeves 41 disposed in confronting relation with the dough pieces of the dough cutters. A plurality of plungers 69 and 70 are arranged in upstanding position and are carried on a suitable mounting plate 71 which, at its opposite corners, is provided with upstanding guide bars 72 having rollers 72a adjacent the upper and lower ends thereof and moving in a vertically oriented guideway 73 which is defined by the upright frame member 74 and side pieces 75 and is rigidly affixed to the frame 27. It will be noted that the plungers 69 and 70 are arranged on the frame plate in a plurality of longitudinally extending lines and transversely extending rows, and it should be noted that all of the plungers 69 on one side of the center line CL are short and all of the plungers 70 on the other side of the center line are long as hereinafter more fully pointed out. The lower ends of the guide bars 72 are interconnected by means of a shaft 76 and a pair of links 77 are rotatably connected by bearings 77a to the shaft for vertically reciprocating the plungers 69 and 70 and the mounting plate 71. The lower ends of the links 77 are rotatably connected to crank arm 78 which are fixed to a shaft 79 to which rotary power is applied by a transmission mechanism 80 which is in turn driven by shaft 81 running longitudinally of the framework and powered by a chain and sprocket 82 and motor 83. The shaft 81 is also connected by means of a chain and sprocket 84, a speed reducer transmission mechanism 84a and chain 58e to the cam 58.

It will further be noted that a plurality of bars 85 extend longitudinally along and above the can conveyor at the can-filling station B, and together with the end frames 85a thereof, define a can-hold-down member to prevent the cans from being uplifted in the sleeves as the wafers and plungers move upwardly therein.

*Operation*

Figure 14:
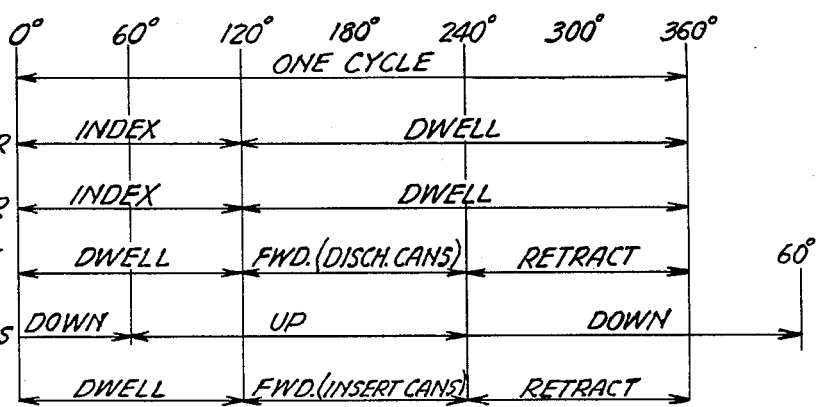
FIG. 14 is a diagrammatic sketch showing the operational phase relationships of the various portions of the machine.

In relation to the operation, attention is invited to FIG. 14 which shows diagrammatically the simultaneous sequence of operation of the several components of the machine. At the outset it should be pointed out that the motor 83, together with the speed reducing mechanism 29c and intermittent drive transmission apparatus 28 produces an intermittent movement of the cutter units 19 such that each time the cutter units are moved, they move a distance equal to three times the width of a single hexagonal opening measured on a line along the path of movement. Assuming that an operational cycle commences with the initial movement of the cutter units on the dough conveyor, the cutter units 19 are in movement for one-third of the cycle and are stationary for the second two-thirds of the cycle.

Likewise, the can-conveying units are moving for the first one-third of the operational cycle and are stationary for the second two-thirds of the cycle. The motor, together with the speed reducing mechanism 50 and the intermittent drive transmission 49 produces the intermittent movement of the can-carrying units 38, and each time the can-carrying units 38 are moved they are moved through a distance equal to twice the width of a hexagonal opening as measured along a row extending obliquely transversely of the path of movement of the cutter units 19, i.e., along the path of movement of the can-carrying units 38.

Because the can-loading pushers 55 and the can-ejecting plungers 63 are mechanically linked together, they move simultaneously. The motor 83, together with the transmission mechanism 85 and the rotary cam 58 cause the pushers 55 and discharge plungers 63 to remain stationary during the first one-third of the operational cycle, and cause the pushers 58 and plungers 63 to reciprocate once during the second two-thirds of the operating cycle for respectively loading empty cans into the sleeves and for ejecting filled cans.

The motor 83 together with the transmission mechanism 80 and the interconnecting linkages to the plungers 69 and 70 produce continuous vertical reciprocation of the plungers 69 and 70. Although the plungers do not remain stationary for any extended period of time, they are timed or synchronized in their movement so that the plungers are completely withdrawn from the hexagonal openings 20a of the cutter units 19 each time the cutter units are moved. In FIG. 14 it will be seen that the plungers 69 and 70 are moving downwardly at the assumed beginning of the operational cycle, and commence their upward movement at the end of sixty degrees of the operational cycle, and commence their downward movement at the beginning of the final one-third of the operational cycle.

More specifically, it will be noted that each time the plungers 69 and 70 are moved upwardly, a hexagonal opening of the cutter units having a wafer therein, is vertically aligned with each of the plungers. The plungers 69 move upwardly into the sleeves 41 so that the upper ends of the plungers are disposed at or slightly above the level of the ledge 43 and the wafer supports 45. During the upward movement of the wafers on the plungers 69, the wafers engage the shank portion 45a and cam the wafer supports outwardly until the wafers pass by the wafer supports, whereupon the wafer supports 45 are resiliently moved inwardly of the sleeve again and into the grooves of the plungers, whereupon when the plungers 69 move downwardly again, the wafer supports will retain the dough wafers thereon. The reciprocation of the elongate plungers 70 is substantially identical to that described in connection with plungers 69 with the exception that the plungers 70 move the wafers past the wafer supports 45 and then upwardly onto the wafer supports 46 whereupon the supports 46 retain the wafer delivered thereto at a position approximately midway of the length of the can C. As the units 38 and cans C travel through the filling station B, the cans C are held downwardly in the sleeves 41 by the bars 85.

It should be noted that as the can-carrying sleeves progressively move from one position to another, each sleeve is, in a successive operational cycle, successively vertically aligned with each of six elongate plungers 70, whereupon six dough wafers are supplied into the can, one below the other, and as successive wafers are supplied the other wafers already in the can are merely lifted upwardly. Likewise, as each sleeve 41 progressively moves further, it is, in the subsequent successive operational cycle, aligned with each of six of the short plungers 69, whereupon six additional dough wafers are supplied into the can and onto the wafer supports 45. While the last mentioned six additional dough wafers are being supplied into the can, the first six wafers are merely supported on the wafer supports 46. At the filling station B, the dough wafers are removed from all of the hexagonal openings of cutter units 19, after which the cutter units pass around the sprockets 26 and back to the dough-receiving and cutting station A again.

The cutter units again receive dough which is cut and presented to additional cans progressively moving along the can conveyor. The packing operation is continuous with each sleeve and can therein receiving a dough wafer during each operational cycle and during each vertical reciprocation of the plungers.

When the cans have received the necessary number of dough wafers, they are moved progressively toward the can ejecting station and will move around the uppermost sprockets 40 and be retained by the bars 68 as the cans tip to a position wherein the closed ends face generally downwardly. Subsequently, the can-ejecting plungers 63 move through the sleeves with the ribs 63a thereof moving through the grooves 44 of the sleeves so that the ribs 63a engage the peripheral end edges of the can sidewalls, and the central portion of the plungers 63 may engage the dough wafer at the open end of the can. As the cans are pushed from the sleeves, the wafer supports 45 and 46 are withdrawn and of course remain with the sleeves 41. The can-carrying units 38 then progressively move around the continuous path to the can loading station.

It will, of course, be understood that various changes may be made in the form, details, arrangement and proportions of the parts without departing from the scope of my invention which consists of the matter shown and described herein and set forth in the appended claims.

What I claim is:

1. A machine for forming individual wafers of dough from a blanket of dough, comprising a plurality of side-by-side, hollow and upright dough cutters with unobstructed ends and each of said cutters having a continuous top cutting edge and inwardly protruding dough-supporting edge means spaced below said edge, means mounting and producing movement of said cutters between a first dough-receiving station and a second wafer-discharging station, means applying a dough blanket onto said cutters and pressing the dough against said cutting edges and completely into said cutters at said first station to define a plurality of wafers each in a respective cutter, a plurality of upstanding plungers beneath the cutters at said second station and being movable upwardly against the wafers and through the cutters to lift the wafers from the cutters, and means for removing the wafers from the plungers.

2. A machine for forming individual wafers of dough from a blanket of dough, comprising a plurality of side-by-side, hollow and upright dough cutters with unobstructed ends and each of said cutters having a top cutting edge and also having means for supporting the dough wafers therein, means mounting and producing movement of said cutters between a first dough-receiving station and a second wafer-discharging station, means applying a dough blanket onto said cutters and pressing the dough against the cutting edges and completely into said cutters at said first station to define a plurality of wafers each in a respective cutter, a plurality of upstanding plungers beneath the cutters at said second station and being movable upwardly against the wafers and through the cutters to lift the wafers from the cutters, and means for removing the wafers from the plungers.

3. A machine for forming individual wafers of dough from a blanket of dough, comprising a plurality of side-by-side, hollow and upright dough cutters with unobstructed ends and each of said cutters having a top cutting edge and also having means for supporting the dough wafers therein, means mounting and producing movement of said cutters between a first dough-receiving station and a second wafer-discharging station, means applying a dough blanket onto said cutters and pressing the dough against the cutting edges and completely into said cutters at said first station to define a plurality of wafers each in a respective cutter, a plurality of upstanding plungers beneath the cutters at said second station and being movable upwardly against the wafers and through the cutters to lift the wafers from the cutters, and means for removing the wafers from the plungers in segregated relation from each other.

4. A machine for forming individual wafers of dough from a blanket of dough, comprising a plurality of hollow and upright, hexagonally shaped and contiguous dough cutters with unobstructed ends and each of said cutters having a continuous top cutting edge and inwardly protruding ledge means spaced below said edge, means mounting and producing movement of said cutters from a first dough-receiving station to a plurality of positions at a wafer-discharging station, means applying a dough blanket onto the cutters and pressing the dough against said cutting edges and completely into said cutters at said first station to define a plurality of wafers each in a respective cutter, a plurality of upstanding plungers beneath the cutters at said second station and being movable upwardly against the wafers and through the cutters to lift the wafers from the cutters, said plungers being spaced from each other a distance equal to the center-to-center distance between non-contiguous cutters and being arranged such that progressive movement of the cutters to said plurality of positions at the second station will cause vertical alignment of each of the cutters with one of the plungers at one of said positions, and means for removing the wafers from the plungers at a position above the cutters.

5. A machine for forming individual wafers of dough from a blanket of dough, comprising a plurality of elongate cutter units each in side-by-side relation with and between a pair of said units, means pivotally interconnecting said side-by-side units together to form a continuous cutter belt, means mounting and producing an intermittent movement of said cutters around a continuous path having an upper and substantially horizontal leg and a lower leg and progressively moving the cutter units along said upper leg from a first dough-receiving station to a second wafer-discharging station, each of said cutter units including a plurality of side-by-side and hollow dough cutters with unobstructed ends and each of said cutters having a continuous cutting edge facing outwardly of said continuous path and facing upwardly along said upper leg, and each of said cutters also having inwardly protruding dough-supporting ledge means spaced below said upwardly facing cutting edge, means applying a dough blanket onto the cutter units and pressing the dough against said cutting edges and completely into said cutters at said first station to define a plurality of wafers each in a respective cutter, a plurality of upstanding plungers at said second station and between the upper and lower legs of said path, means for moving said plungers upwardly against the wafers and through the cutters to lift the wafers from the cutters, and means removing the wafers from the plungers.

6. The invention set forth in claim 5 wherein said cutters are hexagonally shaped and are disposed in contiguous relation with each other on each cutter unit, the cutters of adjacent cutter units also being disposed in contiguous relation with each other.

7. A cutter unit to be used with similar cutter units to form a dough cutter belt, comprising an elongate gridwork having contiguous hexagonally shaped openings therein and being constructed of a plurality of rigid plates each forming sides of contiguous hexagonal openings and each being affixed at its opposite ends to adjacent plates, the plates having unobstructed sharpened edges at one side of the unit and also having unobstructed edges at the other side of the unit, a dough supporting ledge at the periphery of each opening and being affixed to said plates in spaced relation with said sharpened edges and a pair of mounting plates respectively disposed at the opposite ends of the gridwork and extending endwise outwardly therefrom, said plates having means adapted for pivotal connection to other similar units.

8. The invention set forth in claim 7 and said openings being arranged along fore-and-aft lines extending transversely of the elongate unit, the fore-and-aft openings at opposite sides of the gridwork and in alternate lines having fore-and-aft endwise facing side plates for confronting and engaging similar side plates of an opening in the same line in the next adjacent cutter unit.

9. Apparatus for use in forming dough wafers from a blanket of dough, comprising a plurality of elongate cutter units, each in side-by-side relation with and between a pair of said units, each of said units having endwise extending mounting plates on opposite ends thereof, means pivotally interconnecting said mounting plates together to form a continuous cutter belt, a pair of sprockets mounting the belt for movement about a continuous path, each of said units including a plurality of contiguous, side-by-side hollow and hexagonal dough cutters each having unobstructed ends, contiguous cutters having common sidewalls, the sidewalls having sharpened edges facing outwardly of the continuous path and around the entire periphery of each hollow cutter and also having dough-supporting ledges spaced from said sharpened edges and protruding into the hollow interiors of the cutters, said mounting plates being formed integrally with the cutter walls, whereby to form dough wafers by pressing the blanket against said sharpened edges and into the cutters.

10. Apparatus for use in forming dough wafers from a blanket of dough, comprising a plurality of elongate cutter units, each in side-by-side relation with and between a pair of said units, means pivotally interconnecting said side-by-side units together to form a continuous cutter belt, means mounting the belt for movement about a continuous path, each of the units including a plurality of contiguous, side-by-side hollow and hexagonal dough cutters each having unobstructed ends, contiguous cutters having common sidewalls, the sidewalls having sharpened edges facing outwardly of the continuous path and around the entire periphery of each hollow cutter and also having dough-supporting ledges spaced from said sharpened edges and protruding into the hollow interiors of the cutters, each cutter unit having opposite fore-and-aft sides each confronting one side of the next adjacent cutter unit in the belt, the adjacent cutter units having fore-and-aft facing three-sided semi-hexagonal recesses confronting each other and spaced along said fore-and-aft sides, the adjacent cutter units also having reduced thickness sidewalls between said recesses and extending along confronting fore-and-aft sides, said reduced thickness sidewalls being provided with planar fore-and-aft facing surfaces flush against each other and cooperating with each other in separating the dough in contiguous cutters of adjacent units, whereby to form uniform dough wafers by pressing the blanket against said sharpened edges and into the cutters.

11. A cutter unit to be used with similar cutter units to form a dough cutter belt, comprising an elongate integral gridwork having contiguous hexagonally shaped openings with unobstructed ends, the gridwork having a plurality of upright walls encompassing each opening, each wall having a sharpened upper edge and an inner surface facing into the opening, said inner surface having a lower downwardly and inwardly obliquely extending portion whereby to reduce the size of the opening and define a dough support spaced below said sharpened edge, and means at opposite ends of said elongate gridwork for pivotal connection with other similar units.

References Cited in the file of this patent

UNITED STATES PATENTS

| | | |
|---|---|---|
| 219,205 | Braley | Sept. 2, 1879 |
| 1,747,182 | Rosener | Feb. 18, 1930 |
| 2,145,048 | Hagen | Jan. 24, 1939 |
| 2,623,479 | Clinton | Dec. 30, 1952 |
| 2,664,833 | Armstrong | Jan. 5, 1954 |
| 2,707,922 | Ferguson | May 10, 1955 |
| 2,941,341 | Clinton | June 21, 1960 |